(12) United States Patent
Yang et al.

(10) Patent No.: US 8,862,842 B2
(45) Date of Patent: Oct. 14, 2014

(54) METHOD AND APPARATUS FOR MAXIMIZING DATA RECOVERABILITY USING COUPLING UPDATES BY PARTIES

(75) Inventors: Qing K. Yang, Wakefield, RI (US); Weijun Xiao, Kingston, RI (US); Jin Ren, Kingston, RI (US)

(73) Assignee: Rhode Island Board of Education, State of Rhode Island and Providence Plantations, Plantation, RI (US)

( * ) Notice: Subject to any disclaimer, the term of this patent is extended or adjusted under 35 U.S.C. 154(b) by 238 days.

(21) Appl. No.: 12/580,757

(22) Filed: Oct. 16, 2009

(65) Prior Publication Data
US 2010/0100698 A1 Apr. 22, 2010

Related U.S. Application Data

(63) Continuation of application No. PCT/US2008/065059, filed on May 29, 2008.

(60) Provisional application No. 60/940,831, filed on May 30, 2007.

(51) Int. Cl.
| | |
|---|---|
| *G06F 12/00* | (2006.01) |
| *G06F 11/14* | (2006.01) |
| *G06F 11/34* | (2006.01) |

(52) U.S. Cl.
CPC ........ *G06F 11/1451* (2013.01); *G06F 2201/87* (2013.01); *G06F 11/1469* (2013.01); *G06F 11/1453* (2013.01); *G06F 11/1456* (2013.01); *G06F 2201/84* (2013.01); *G06F 2201/86* (2013.01); *G06F 11/3428* (2013.01); *G06F 11/1464* (2013.01)
USPC .......................................... 711/162; 711/154

(58) Field of Classification Search
USPC .................................................. 711/154, 162
See application file for complete search history.

(56) References Cited

U.S. PATENT DOCUMENTS

| | | | |
|---|---|---|---|
| 5,613,088 A * | 3/1997 | Achiwa et al. ................ | 711/155 |
| 6,560,615 B1 | 5/2003 | Zayas et al. | |
| 2002/0166079 A1 | 11/2002 | Ulrich et al. | |

OTHER PUBLICATIONS

International Search Report and Written Opinion issued on Sep. 26, 2008 in connection with International Application PCT/US08/65059, 8 pages.
International Preliminary Report on Patentability issued on Dec. 1, 2009 in connection with International Application PCT/US08/65059, 6 pages.

* cited by examiner

*Primary Examiner* — Matthew Bradley
(74) *Attorney, Agent, or Firm* — Gesmer Updegrove LLP

(57) ABSTRACT

A data recovery system is disclosed that permits recovery of data in a computer memory. The system includes an update storage system, a long-term storage system, a coupling functional circuit, and a parity register. The update storage system is for providing backup storage of recently updated data. The long-term storage system is for providing backup storage of data that has not been recently updated. The coupling functional circuit is for providing a bit-wise commutative binary operation of data from the update storage system and from the long term storage system. The parity register is for maintaining parity snapshots of the output of the coupling functional circuit.

20 Claims, 3 Drawing Sheets

METHOD AND APPARATUS FOR MAXIMIZING DATA RECOVERABILITY USING COUPLING UPDATES BY PARTIES

PRIORITY

The present application is a continuation of International Patent Application No. PCT/US08/065,059, filed on May 29, 2008, which claims priority to U.S. Provisional Patent Application No. 60/940,831 filed May 30, 2007, all of which are incorporated herein in their entirety.

GOVERNMENT SPONSORSHIP

The present invention was made with U.S. Government support under NSF Grant No. CCR-0312613. The U.S. Government has certain rights to this invention.

BACKGROUND

The invention generally relates to data recover systems, and relates in particular to systems that provide data recovery in computer systems that fail in such a way that backup systems and snapshot systems may not provide sufficient protection of data.

With explosive growth of networked information services and e-commerce, data protection and recovery have become the top priority of business organizations and government institutions. Since data is typically an extremely valuable asset of an organization, any loss or unavailability of data can cause millions of dollars of damage. Unfortunately, failures do occur such as hardware failures, human errors, software defects, virus attacks, power failures, site failures, etc. In order to protect data from possible failures and to be able to recover data in case of such a failure, data protection technology is necessary.

Traditionally, data protection has been done using periodic backups. At the end of a business day or the end of a week, data is backed up to tapes. Depending on the importance of data, the frequency of backups varies. The higher the backup frequency, the larger the backup storage is required. In order to reduce the backup volume size, technologies such as incremental backups and copy-on-write (COW) snapshots have been commonly used. Instead of making full backups every time, incremental backups and COW snapshots store only the changed data, and this is done more frequently, between full backups. For example, one may perform daily incremental backups and weekly full backups that are stored at both the production site (that includes a server host and production storage) and a backup site (that includes a backup server, and a backup storage). The production site and the backup site are connected to one another by a communication system such as a network. In this way, great storage savings are possible while keeping data protected.

Incremental backup works as follows. Starting from the previous backup point, the storage keeps track of all changed blocks. At the backup time point, a backup volume is formed consisting of all of the latest changed data blocks. As a result, the incremental backup contains the newest data that have changed since the last backup. COW snapshots work differently from the incremental backup. At the time when a snapshot is created, a small volume is allocated as a snapshot volume with respect to the source volume. Upon the first write to a data block after the snapshot was started, the original data of the block is copied from the source volume to the snapshot volume. After copying, the write operation is performed on the block in the source volume. As a result, the data image at the time of the snapshot is preserved. Write I/Os after the first change to a block is performed as usual, i.e., only the first write to a block copies the original data to the snapshot volume. There have been many variations of COW snapshots in terms of implementation details for performance and efficiency purposes such as pointer remapping and redirect-on-writes etc. The main advantage of both incremental backups and COW snapshots is storage savings because only changed data is backed up.

Despite the rapid advances in computer technology over the past three decades, data backup is fundamentally performed the same as it was 30 years ago. It is well known that backup remains a costly and highly intrusive batch operation that is prone to error and consumes an exorbitant amount of time and resources. There has been research reported in the literature recently on improving data availability and recoverability such as continuous data protection (CDP), synchronous/asynchronous data replications, and data de-duplications. While these technologies aimed at increasing the backup frequency and reducing storage sizes for backup volumes, the fundamental techniques used are still based on incremental backups or COW snapshots. It appears to be generally accepted within the information technology (IT) community that these techniques will usually work and that data can usually be recovered.

The reality, however, is that in a substantial number of cases, backup data is not sufficiently recovered, and even if data is recovered, it takes hours and even days to do so.

There remains a need to provide a data recovery system and method that may function in further conditions of failure and that provides improved protection of data in storage subsystems.

SUMMARY

The invention provides a data recovery system that permits recovery of data in a computer memory in accordance with an embodiment. The system includes an update storage system, a long-term storage system, a coupling functional circuit, and a parity register. The update storage system is for providing backup storage of recently updated data. The long-term storage system is for providing backup storage of data that has not been recently updated. The coupling functional circuit is for providing a bit-wise commutative binary operation of data from the update storage system and from the long term storage system. The parity register is for maintaining parity snapshots of the output of the coupling circuit.

BRIEF DESCRIPTION OF THE DRAWINGS

The following description may be further understood with reference to the accompanying drawings in which.

Figure 1:
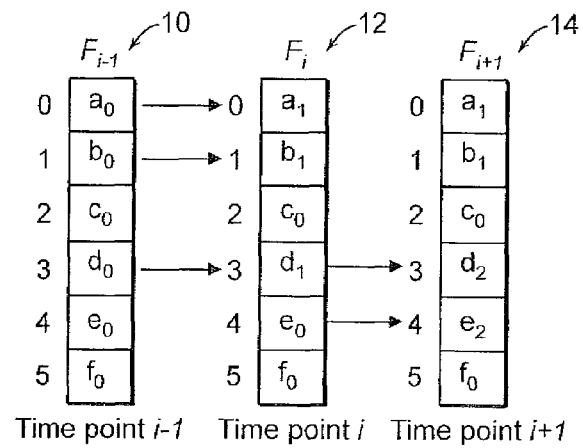
FIG. 1 shows an illustrative diagrammatic view of data storage at times $t_{i-1}$, $t_i$ and $t_{i+1}$ in a system in accordance with an embodiment of the invention.

The drawings are shown for illustrative purposes only.

DETAILED DESCRIPTION

The present invention involves studying COW snapshot and incremental backup technologies from the block level storage point of view. The present investigation has uncovered fundamental limitations of the existing data protection technologies and provides a theoretical explanation as to why so many data recoveries (by some reports over 67%) failed using existing technologies. Data recovery capabilities and limitations of the existing technologies have been reviewed mathematically, and a theoretical foundation has been developed by the present inventors for data protection technologies. Based on the inventor's theoretical results, a storage architecture is described herein that overcomes the limitations of existing technologies. The architecture may be implemented as a simple modification of existing processor and memory technologies.

The capabilities and limitations of current data protection technologies may be considered as follows. Consider the two data protection technologies of COW snapshot and incremental backup. COW snapshot keeps the original data upon a write operation whereas incremental backup keeps the freshest data. In order to study the capabilities and limitations of these existing technologies, we formally define several mathematical terms and their relationships with the storage technologies.

Let us assume that the data storage we try to study consists of independent and equally sized data blocks (the specific size of a block is not significant in this discussion). Each of these data blocks is identified by an LBA (logic block address) and contains a specific data value. Let A be the entire set of LBA's of the data storage considered and D represent the set of all possible data values contained in data blocks. A binary relation, R, between A and D defines a mapping of addresses to their corresponding data values of the data storage. Since there is exactly one ordered pair in R with each LBA, this binary relation is a function. We refer this function as storage data and use $F_t$ to represent this function (storage data) from A to D at time t. And we use $f_t(a)$ to represent the image or data value of an LBA a. That is, $F_t$ contains a set of ordered pairs such as $\{(a_1,d_1), (a_2,a_2) \ldots \}$ whereas $f_t(a)$ is an image/data value of a such as $f_t(a_1)=d_1$. If A' is a subset of A, i.e. $A' \subseteq A$, then we use $F_t/A'$ to represent the restriction of $F_t$ to A'. That is, $F_t/A'=F_t \cap (A' \times D)$. Without loss of generality, let us consider three time points: i−1 starting point, i+1 current point, and i recovery point.

Suppose that time point i−1 represents the original time point when data storage operation starts and time point i+1 represents the current time point. Suppose a failure occurred at some time near point i+1. We are interested in recovering data to the data as it was at time point i. We use integer numbers to represent time points since all storage events occur at discrete time points with a clear sequential ordering.

Definition 1. Let $A_i \subseteq A$ be a set of LBAs. We define $A_i$ to be a write set i if it contains all LBAs whose data value have been overwritten between time point i−1 and time point i. The value $A_i$ contains all LBAs whose data values have been changed by write operations between time point i−1 and time point i while $A_{i+1}$ contains all those between time point i and time point i+1.

EXAMPLE 1

If we have $F_i=\{(0,2), (1,5), (2,8)\}$ at time point i and $F_{i+1}=\{(0,4), (1,5), (2,0)\}$ at time point i+1 because of write operations, then we have $A_{i+1}=\{0,2\}$. That is, data values at addresses 0 and 2 have been changed from 2 and 8 to 4 and 0, respectively, whereas the data value of address 1 has not been changed, since time point i. It is possible that the overwritten value as seen at time i is the same as the original value at time i−1 caused by one or several write operations between time points i−1 and i. We therefore define substantial write set that actually changed data values as follows.

Definition 2. Let $A'_i \subseteq A_i$. We define $A'_i$ to be a substantial write set i if the data value of every LBA in $A'_i$ has been changed between time point i−1 and time point i.

It should be noted here that the changed data value is generally not related to the original value because of the nature of write operations at block level storages. That is, $F_{i+1}(a)$ is independent of $F_i(a)$. Furthermore, $F_i(a)$ is independent of $F_i(b)$ for all b∈A and b≠a as stated above: data blocks are independent.

Definition 3: A COW snapshot as seen at time i+1 that was started at time i is defined as $F_i/A_{i+1}$, where $A_{i+1}$ is write set i+1.

As we know, COW snapshot makes a copy of original data upon the first write to the block. As a result, it keeps a set of original data of all changed blocks since the snapshot started. Consider the storage data in Example 1. Suppose the COW snapshot was started at time point i. At time point i+1, we have the snapshot: $\{(0,2), (2,8)\}$, which is $F_i/A_{i+1}$. That is, $A_{i+1}$ gives all the LBAs that have been written, $\{0,2\}$, and their respective images in the snapshot should be the same as they were at time point i, $\{2,8\}$.

Lemma 1. If we have storage data at time i+1 and a COW snapshot started at time i, then we can recover data as they were at time i as follows:

$$F_i=(F_{i+1}-F_{i+1}/A_{i+1}) \cup F_i/A_{i+1}, \quad (1)$$

where "−" and "∪" are difference and union operators of sets, respectively.

The proof of this lemma is straightforward by noting that $F_i/A_{i+1}$ is the COW snapshot as seen at time i+1 that was started at time i and $F_{i+1}/A_{i+1}$ are all storage data that have been changed since time point i. Equation (1) replaces all changed data with the COW snapshot that represents the original data before changes occur. This is a typical undo recovery process.

Lemma 1 gives the data recovery capability of COW snapshot technology. It is able to recover data to a previous time point provided that the most recent data is available. This data recovery capability is very useful in practice in case of data corruption, virus attack, user errors, software bugs, and so forth. If we know that data was good at a previous time point when snapshot was started, we can go back to that point to recover from failures caused by this type of events.

Although COW snapshot can recover data to a previous time point as stated in Lemma 1, it has limitations. In particular, if the current data (production data) is damaged or lost because of hardware failures, OS failures, outages, or disasters, we cannot recover data to a previous time point even if we have COW snapshots and previous backup data that may be safely stored in a remote backup site. This limitation is formally stated in the following theorem.

Theorem 1. Suppose the storage data at time point i+1, $F_{i+1}$, is not available and the substantial write set $A'_i$ is not empty ($A'_i \neq \phi$). COW snapshots cannot recover storage data $F_i$ as they were at time point i if $A'_i \subseteq A_{i+1}$.

Proof: We prove this theorem by contradiction. Let us assume that COW snapshots can recover storage data $F_i$ as they were at time point i without $F_{i+1}$. That is, for all α∈A, we can reconstruct $F_i(\alpha)$ from what we have available:

a) Data backup made previously: $F_{i-1}$
b) COW snapshot as seen at time i that was started at time i−1: $F_{i-1}/A_i$, and
c) COW snapshot as seen at time i+1 that was started at time i: $F_i/A_{i+1}$.

Since different data blocks are independent in our storage system, for every LBA α∈A, the only way to reconstruct its data value, $F_i(α)$, is to reconstruct it from $F_{i-1}(α)$, $F_{i-1}/A_i(α)$, and/or $F_i/A_{i+1}(α)$.

Because $A'_i \subseteq A_{i+1}$ and $A'_i \neq \phi$, there is an LBA that is in $A'_i$ but not in $A_{i+1}$. Let β be such an LBA such that $β \in A'_i$ but $β \in A_{i+1}$. Now consider the three cases:
a) Since $β \in A'_i$, we have $F_i(β) \neq F_{i-1}(β)$ by Definition 2.
b) Because $F_{i-1}/A_i \subseteq F_{i-1}$ and $A'_i \subseteq A_i$, we have $F_{i-1}/A_i(β) = F_{i-1}(β) \neq F_i(β)$
c) The fact that $β \notin A_{i+1}$ implies that $F_i/A_{i+1}(β)$ is undefined because β is not in the domain of $F_i/A_{i+1}$.

Furthermore, $F_i(β)$ is not related in any way to $F_{i-1}(β)$ because of the nature of write operations at block level storages. As a result, it is impossible to rebuild $F_i(β)$ from $F_{i-1}(β)$, $F_{i-1}/A_i(β)$, and/or $F_i/A_{i+1}(β)$, a contradiction to our assumption. Therefore, COW snapshots cannot recover storage data $F_i$.

FIG. 1 shows an example of undo recovery of COW snapshots at $F_{i-1}$ (as shown at 10), at $F_i$ (as shown at 12) and at $F_{i+1}$ (as shown at 14), where write sets are $A_i$: {0,1,3} and $A_{i+1}$: {3,4}; and Substantial Write Sets are $A'_i$: {0,1,3} and $A'_{i+1}$: {3,4}. Snapshots are started at time point i−1: {$(0,a_0),(1,b_0),(3,d_0)$}, and started at time point i: $F_i/A_{i+1}$: {$(3,d_1),(4,e_0)$}. The Undo recovery is possible but redo recovery is not: storage data at time i, $F_i$, can be recovered from snapshot $F_i/A_{i+1}$ and $F_{i+1}$ by replacing the changed data blocks between time points i and i+1 with the corresponding data blocks in $F_i/A_{i+1}$. However, if the newest data $F_{i+1}$ is damaged, with the original data $F_{i-1}$ and the snapshots, we can not recover storage data $F_i$ as they were at time point i because $A'_i$ is not a subset of $A_{i+1}$. Particularly, data blocks $(0, a_1)$ and $(1, b_1)$ that are part of the storage data at time i cannot be generated from $F_{i-1}$, $F_{i-1}/A_i$, and $F_i/A_{i+1}$ in any way.

EXAMPLE 2

Figure 3:
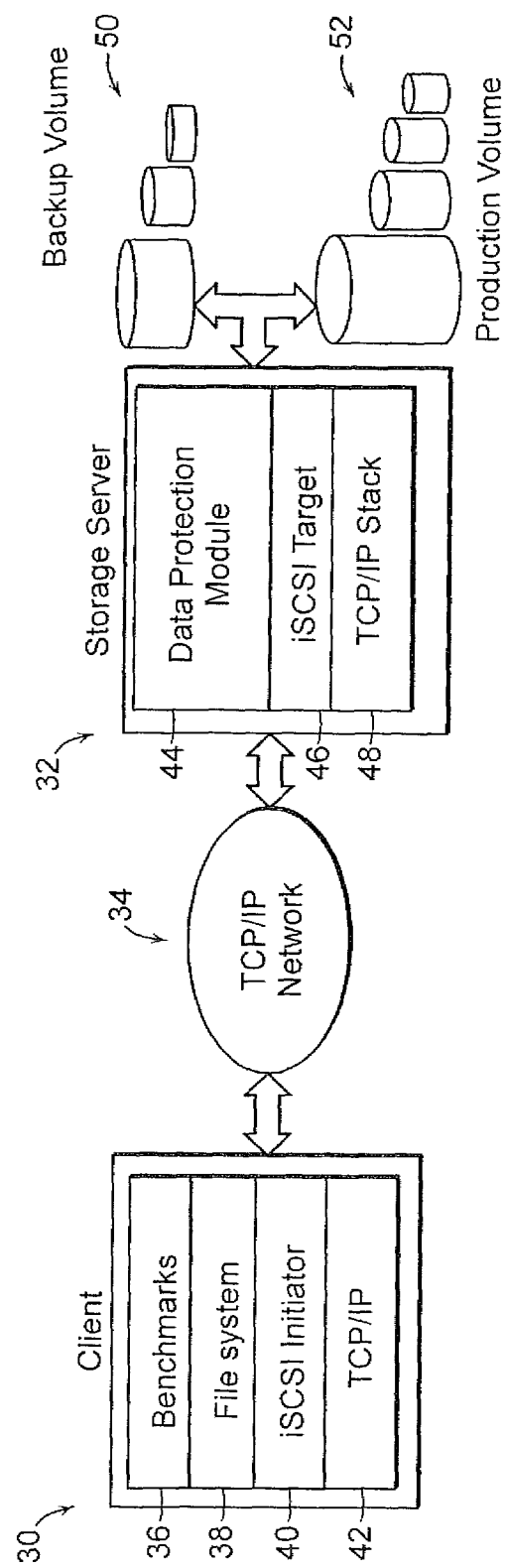
FIG. 3 shows an illustrative diagrammatic view of a client/server data storage system employing a data recovery system in accordance with an embodiment of the invention.

Consider one example with 6 blocks in the storage data as shown in FIG. 3. At time point i−1, we have {$(0, a_0), (1, b_0), (2, c_0), (3, d_0), (4, e_0), (5, f_0)$}. From time point i−1 to time point i, three blocks have been changed to: {$(0, a_1), (1, b_1), (3, d_1)$}, with the substantial write set being {0, 1, 3}. From time point i to time point i+1, two blocks have been changed to: {$(3, d_2), (4, e_2)$} with the substantial write set being {3, 4}. By Definition 3, we have snapshot $F_{i-1}/A_i$ as {$(0, a_0), (1, b_0), (3, d_0)$} and snapshot $F_i/A_{i+1}$ as {$(3, d_1), (4, e_0)$}. When original data $F_{i-1}$ is unavailable, storage data $F_i$ can be reconstructed from COW snapshot $F_i/A_{i+1}$ and $F_{i+1}$ by replacing the changed blocks $(3, d_2)$ and $(4, e_2)$ in $F_{i+1}$ with original data blocks $(3, d_1)$ and $(4, e_0)$ in $F_i/A_{i+1}$, respectively. If fresh data $F_{i+1}$ is damaged, however, $F_i$ cannot be recovered from $F_{i-1}$ and snapshots because substantial write set $A'_i$ is not a subset of write set $A_{i+1}$ as stated in Theorem 1. In this particular case, data blocks $(0, a_1)$ and $(1, b_1)$ cannot be rebuilt from original data $F_{i-1}$ and snapshots in any way.

Definition 4: The incremental backup as seen at time i that was started at time i−1 is defined as $F_i/A_i$, where $A_i$ is write set i.

Incremental backups keep the latest changes on data storage. Consider Example 1 again, the incremental backup at time point i is {(0, 4), (2, 0)}. In Example 2, the incremental backup at time point i is {$(0,a_1),(1,b_1),(3,d_1)$}.

Lemma 2. If we have storage data at time i−1 and an incremental backup as seen at time i, then we can recover data as they were at time i as follows:

$$F_i = (F_{i-1} - F_{i-1}/A_i) \cup F_i/A_i, \quad (2)$$

where "−" and "∪" are difference and union operators of sets, respectively.

The proof of the lemma 2 is straightforward by noting that $F_i/A_i$ is the incremental backup as seen at time i that was started at time i−1 and $F_{i-1}/A_i$ are all original data at locations that have been changed. Since $F_i/A_i$ contains all the latest changes from time point i−1 to time point i, storage data $F_i$ can be obtained by replacing the original storage data with the incremental backup as shown in Equation (2). This is a typical redo recovery process.

Lemma 2 gives the redo recovery capability of incremental backup technology. It is able to recover data to a recent time point when the original storage data is available. This redo recovery can be used in practice in case of disk failures, volume crash, OS failures, outages, disasters, and so on. If we created a full data backup prior to the incremental backup was started, we can reconstruct the storage data to the latest time point in case of this type of failures.

While incremental backup can recover data as stated in Lemma 2, it also has limitations. Particularly, if the current data gets corrupted because of virus or user errors and it happens that we do not have a prior full backup, we cannot recover data to a good time point using incremental backups and current data that are available. This limitation is formally stated in the following theorem.

Theorem 2. Suppose the storage data at time point i−1, $F_{i-1}$, is not available and substantial write set $A'_{i+1}$ is not empty ($A'_{i+1} \neq \phi$). Incremental backups cannot recover storage data $F_i$ as they were at time point i if $A'_{i+1} \subseteq A_i$.

Proof:

We prove this theorem by contradiction and assume incremental backups can reconstruct the storage data at time i, $F_i$. Since the original storage data, $F_{i-1}$, is not available, the only storage data sets available to us for recovery purpose are:
a) Current production data: $F_{i+1}$,
b) Incremental backup as seen at time i that was started at time i−1: $F_i/A_i$ and
c) Incremental backup as seen at time i+1 that was started at time i: $F_{i+1}/A_{i+1}$.

For every data block, let α be an LBA that is in A. (α, $F_i(α)$)∈$F_i$ is part of the storage data at time i to be reconstructed. Because data blocks are independent and there is no relation among different data blocks, $F_i(α)$ should be reconstructed by $F_{i+1}(α)$, $F_i/A_i(α)$, and/or $F_{i+1}/A_{i+1}(α)$. Now, let us consider one specific block. Since $A'_{i+1} \subseteq A_i$ and $A'_{i+1} \neq \phi$, there is an LBA that is in $A'_{i+1}$ but not in $A_i$. Let β be an LBA such that $β \in A'_{i+1}$ but $β \notin A_i$. Clearly, (β, $F_i(β)$)∈$F_i$ is part of the storage data at time i and it can be reconstructed by the available data values corresponding to block β. That is, $F_i(β)$ can be generated from $F_{i+1}(β)$, $F_i/A_i(β)$, and/or $F_{i+1}/A_{i+1}(β)$. Now, consider these three data values.
a) Since $β \in A'_{i+1}$, we have $F_{i+1}(β) \neq F_i(β)$ by Definition 2.
b) Because $F_{i+1}/A_{i+1}$ is a restriction of $F_{i+1}$ and $A'_{i+1} \subseteq A_{i+1}$, we have $F_{i+1}/A_{i+1}(β) = F_{i+1}(β) \neq F_i(β)$.
c) Now, we know that $β \notin A_i$, $F_i/A_i(β)$ is undefined.

Among these three data values corresponding to block β, the first two of them have the same value, $F_{i+1}(β)$, and the third one is undefined. Therefore, it is impossible to rebuild $F_i(β)$ from $F_{i+1}(β)$, $F_i/A_i(β)$, and/or $F_{i+1}/A_{i+1}(β)$ because there is no dependency between $F_{i+1}(β)$ and $F_i(β)$ from the storage point of view. This fact contradicts to the assumption.

We can conclude incremental backup cannot recover storage data $F_i$ as they were at time point i.

EXAMPLE 3

Figure 4:
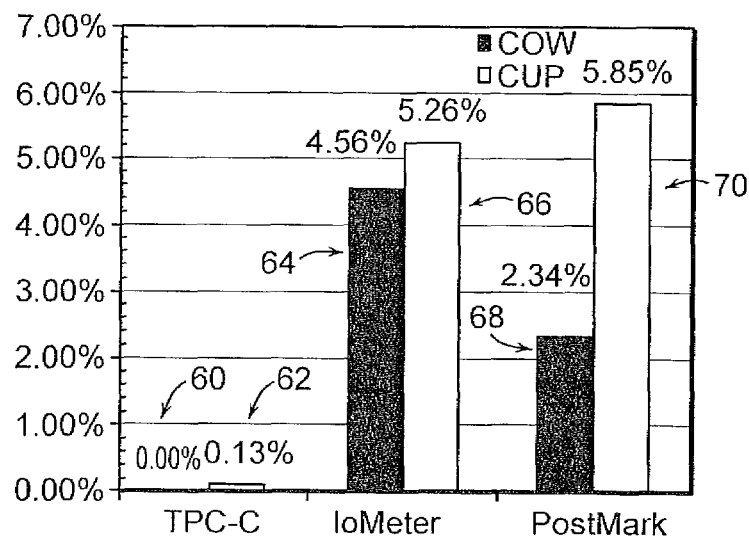
FIG. 4 is an illustrative graphical representation of performance penalty comparisons between a prior art COW system and a system in accordance with an embodiment of the invention wherein the data protection interval is 5 minutes.

Using the same storage scenario as Example 2, we give an example of incremental backups. As shown in FIG. 4, we have incremental backup $F_i/A_i$ as seen at time point i as $\{(0, a_1), (1, b_1), (3, d_1)\}$ and incremental backup $F_{i+1}/A_{i+1}$ as seen at time point i+1 as $\{(3, d_2), (4, e_2)\}$. When fresh data $F_{i+1}$ is damaged, storage data $F_i$ can be recovered from $F_{i-1}$ and incremental backup $F_i/A_i$ by overwriting all data blocks in $F_i/A_i$ at the positions of storage data $F_{i-1}$. However, if original data $F_{i-1}$ is unavailable, storage data $F_i$ cannot be rebuilt from $F_{i+1}$ and incremental backups because $A'_{i+1}$ is not a subset of $A_i$ as stated in Theorem 2. Particularly, data block $(4, e_0)$ in $F_i$ cannot be generated by fresh data $F_{i+1}$ and incremental backups in any way.

With reference again to FIG. 1, which shows an example of a redo recovery of incremental backups at times $F_{i-1}$ (as shown at 10), $F_i$ (as shown at 12) and $F_{i+1}$ (as shown at 14), incremental backups are as seen at time point i: $F_i/A_i$: $\{(0,a_1), (1,b_1),(3, d_1)\}$ and as seen at time point i+1: $F_{i+1}/A_{i+1}$: $\{(3, d_2),(4,e_2)\}$. Redo recovery is possible but not undo recovery: Storage data $F_i$ can be recovered from original data $F_{i-1}$ and incremental backup $F_i/A_i$ by overwriting all the data blocks in $F_i/A_i$ at the positions of storage data $F_{i-1}$. However, if original data $F_{i-1}$ is unavailable, we cannot recover storage data $F_i$ because $A'_{i+1}$ is not a subset of $A_i$. In particular, data block $(4, e_0)$ in $F_i$ cannot be generated from $F_{i+1}$, $F_{i+1}/A_{i+1}$, and $F_i/A_i$ in any way.

As we described above, snapshots cannot redo storage data to a recent time point while incremental backups cannot undo storage data to a previous good point. The reason is that snapshots do not keep the fresh data and incremental backups do not store the original data. To overcome the limitations, a straightforward approach is to keep both versions of data every time a data change occurs. Particularly, at time point i, both snapshot $F_{i-1}/A_i$ for the original data and incremental backup $F_i/A_i$ for the fresh data as seen at time point i are stored at the backup volume. Similarly, $F_i/A_{i+1}$ and $F_{i+1}/A_{i+1}$ at time point i+1 are kept in the storage. From Lemma 1 and Lemma 2, one can easily find that storage data at time point i, $F_i$, can be recovered by using COW snapshot $F_i/A_{i+1}$ and fresh data $F_{i+1}$ when storage data $F_{i-1}$ is unavailable, or by using incremental backup $F_i/A_i$ and original data $F_{i-1}$ when fresh data $F_{i+1}$ is damaged or lost.

Although above approach can recover data in two directions, it requires double amount of storage space because two versions of changed data are stored at backup storage. The question to be asked is: whether an architecture can provide two-way recovery with the same size storage space?

This question requires seeking a new data protection technology. The idea of to approach herein involves storing the original or the new data of a block upon a write operation. We couple the two using a commutative and invertible function. The result of the coupling is stored for data protection purpose. The function should be computationally efficient and should result in the same size data block for the function value. With increasing high speed and low cost embedded processors, this can be done easily and efficiently. For example, addition and Exclusive-OR are such functions.

In general, let us define $G_i$ to be a function at time point i on $A_i$, the same domain as snapshot $F_{i-1}/A_i$ and incremental backup $F_i/A_i$. Similarly, we can have $G_{i+1}$ defined on $A_{i+1}$ at time point i+1. If snapshot $F_i/A_{i+1}$ as seen at time i+1 can be obtained from $G_{i+1}$ and $F_{i+1}$, or incremental backup $F_i/A_i$ can be obtained from $G_i$ and $F_{i-1}$, we can still apply Equation (1) in Lemma 1 for undo recovery, or Equation (2) in Lemma 2 for redo recovery. In other words, $G_i$ can provide two-way data recovery. On the other hand, $G_i$ has the same number of ordered pairs as snapshot $F_{i-1}/A_i$ or incremental backup $F_i/A_i$ because they have the same function domain $A_i$. That is, $G_i$ needs the same size storage space as $F_{i-1}/A_i$ or $F_i/A_i$ if we assume data values of each LBA for $F_{i-1}/A_i$, $F_i/A_i$, and $G_i$ occupy same storage size. Therefore, $G_i$ is our objective function that needs to be designed.

Theorem 3. Let "+" be a commutative binary operator on D and $G_i(\alpha)=F_{i-1}/A_i(\alpha)+F_i/A_i(\alpha)$ for all $\alpha \in A_i$. If there exists an invertible operator "−" on D, such that for any $d_1, d_2 \in D$, $d_1+d_2-d_2=d_1$, then the storage data at time i, $F_i$, can be recovered from $F_{i+1}$ and $G_{i+1}$ by an undo process when $F_{i-1}$ is unavailable, or from $F_{i-1}$ and $G_i$ by a redo process when fresh data $F_{i+1}$ is damaged or lost. Commutative binary operators that may be suitable include, for example, exclusive-OR, exclusive-NOR, and addition.

We prove this theorem in two steps corresponding to two cases.

a) Original data $F_{i-1}$ is unavailable. First, let us consider function $G_{i+1}$ at time point i+1: $G_{i+1}(\beta)=F_i/A_{i+1}(\beta)+F_{i+1}/A_{i+1}(\beta)$ for all $\beta \in A_{i+1}$. From this equation, we know $F_i/A_{i+1}(\beta)=G_{i+1}(\beta)-F_{i+1}/A_{i+1}(\beta)$ by applying invertible operator "−" to $F_{i+1}/A_{i+1}(\beta)$ on both sides of the equation. Furthermore, $F_{i+1}/A_{i+1} \subseteq F_{i+1}$ implies $F_{i+1}/A_{i+1}(\beta) F_{i+1}(\beta)$. Replacing $F_{i+1}/A_{i+1}(\beta)$ with $F_{i+1}(\beta)$ in above equation, we have $F_i/A_{i+1}(\beta)=G_{i+1}(\beta)-F_{i+1}(\beta)$. In other words, snapshot $F_i/A_{i+1}$ as seen at time i+1 can be obtained from fresh data $F_{i+1}$ and $G_{i+1}$. By applying Equation (1) in Lemma 1, storage data $F_i$ can be recovered from $F_{i+1}$ and $G_{i+1}$.

b) Fresh data is damaged or lost. Consider function $G_i$ at time point i: $G_i(\alpha)=F_{i-1}/A_i(\alpha)+F_i/A_i(\alpha)$ for all $\alpha \in A_i$. Since operator "+" is commutative, we have $G_i(\alpha)=F_i/A_i(\alpha)+F_{i-1}/A_i(\alpha)$ by commutating the two terms on the right side of the equation. Applying the inverse operation to above equation, we obtain $F_i/A_i(\alpha)=G_i(\alpha)-F_{i-1}/A_i(\alpha)$. Because $F_{i-1}/A_i \subseteq F_{i-1}$, we have $F_{i-1}/A_i(\alpha)=F_{i-1}(\alpha)$. Replacing $F_{i-1}/A_i(\alpha)$ with $F_{i-1}(\alpha)$ in above equation, we have $F_i/A_i(\alpha)=G_i(\alpha)-F_{i-1}(\alpha)$. This equation indicates that incremental backup $F_i/A_i$ as seen at time i can be obtained from original data $F_{i-1}$ and $G_i$. By applying Equation (2) in Lemma 2, storage data $F_i$ can be reconstructed from $F_{i-1}$ and $G_i$.

Theorem 3 indicates that $G_i$ can provide two-way data recovery with the same amount of storage space overhead as COW snapshot and incremental backup technologies As shown in Theorem 3, any commutative binary operator with an invertible operator can be used to define function $G_i$. For example, simple addition, Exclusive-OR, or inverse Exclusive-OR can be chosen for $G_i$. $G_i$ trades off high-speed computation for storage space over the approach of keeping both versions of data. We can leverage powerful computation capability of modem computer systems to save storage space. Large storage space is not only costly but also takes more time to recover data, which is undesirable.

EXAMPLE 4

We give an example of function $G_i$ by using Exclusive-OR operation. Suppose $G_i=F_{i-1}/A_i \oplus F_i/A_i$, where $\oplus$ is logical Exclusive-OR operator. By computing parities between the original data and the fresh data, we store parities at time i and i+1 for recovery. We therefore call this method CUP: Coupling Updates by Parties. Obviously, CUP can recover storage data in two-way from parities.

Figure 2:
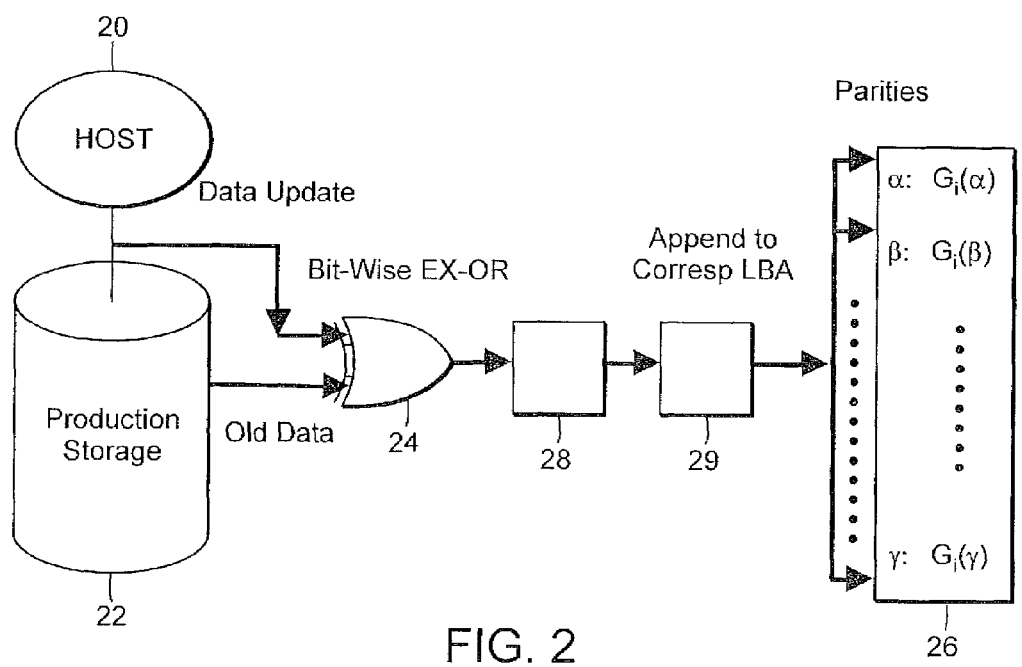
FIG. 2 shows an illustrative diagrammatic view of a data recovery system in accordance with an embodiment of the invention.

FIG. 2, for example shows the overall structure of CUP design. In particular, the system includes a server host 20 that is coupled to production storage 22. Data updates from the path between the server host 20 and the production storage 22 are provided to a first input of a bit-wise Exclusive Or gate 24, and old data from the production storage 22 is provided to a second input of the bit-wise Exclusive Or gate 24. The output of the bit-wise Exclusive Or gate 24 is provided to data register of parity snapshots via an encoder 28 and LBA detector 29. Instead of storing either the newly updated data block or the old data block upon an update from the host computer, we couple both using an Exclusive-OR function.

To verify the data recoverability and enable quantitative performance evaluation for three data protection technologies: COW snapshot, incremental backup, and CUP, we have designed and implemented these three data protection technologies embedded in an iSCSI target. iSCSI is a block level network storage protocol on top of TCP/IP. Using our experimental system, we installed our prototype software on a PC serving as a storage server, as shown in FIG. 3. In particular, the software stack of the system includes a client 30 that is in communication with a storage server 32 via a TCP/IP network 34. The client 30 includes benchmarks 36, a file system 38, an iSCSI initiator 40 and a TCP/IP interface 42. The storage server 32 includes a data protection module 44, an iSCSI target 46, and a TCP/IP stack 48. A back-up volume 50 and a production volume 52 are in communication with each other and with the storage server 32. Two PCs are interconnected using Intel's NetStructure 10/100/1000 Mbps 470T switch. As shown, one of the PCs acts as a client running benchmarks with iSCSI initiator installed and the other acts as the storage server with our iSCSI target installed.

The hardware and software characteristics of our experimental settings are listed in Table 1. We installed Redhat 9 (Linux Kernel 2.4.20) and Microsoft Windows XP Professional on the PCs. On the Linux machine, the UNH iSCSI initiator is installed and on the Windows machines the Microsoft iSCSI initiator is installed. On top of the iSCSI target and the data protection module, we set up Postgres Database 8.1.4. Two different file systems, Linux Ext3 and Windows NTFS, are also installed to run file system benchmarks. We chose a database benchmark TPC-C and two File system benchmarks, PostMark on Linux Ext3 and IoMeter on Windows NTFS.

TPC-C is a well-known database benchmark to model the operational end of businesses where real-time transactions are processed. TPC-C simulates the execution of a set of distributed and online transactions (OLTP) for a period of two to eight hours. TPC-C incorporates five types of transactions with different complexity for online and deferred execution on a database system. These transactions perform the basic operations on databases such as inserts, deletes, updates and so on. For TPC-C benchmark, we use the implementation from TPCC-UVA. Five warehouses with 50 users are built on a Postgres database taking 2 GB storage space.

Table 1 below shows hardware and software environments as used.

TABLE 1

| PC1 | P4 2.8 GHz/256 M RAM/80 G + 10 G Hard Disks |
| PC2 | P4 2.4 GHz/2 GB RAM/200 G + 10 G Hard Disks |
| OS | Windows XP Professional SP2 |
| | Redhat 9 (Linux Kernel 2.4.20) |
| iSCSI | UNH iSCSI Initiator 1.6 |
| | Microsoft iSCSI Initiator 2.0 |

TABLE 1-continued

| Benchmarks | TPC-C UVA 1.2.3 |
| | IoMeter 2003.12.16 |
| | PostMark 1.5.1 |
| Network | Intel NetStructure 470T Switch |
| | Intel PRO/1000 XT Server Adapter (NIC) |

Besides TPC-C benchmark running on Postgres database, we have run two file system benchmarks: PostMark and IoMeter. PostMark is a widely used file system benchmark tool written by Network Appliance. It measures performance in terms of transaction rate in an ephemeral small-file environment by creating a large pool of continually changing files. Once the pool has been created, a specified number of transactions occur. Each transaction consists of a pair of smaller transactions, i.e. create file/delete file and read file/append file. Each transaction's type and files it affected are chosen randomly. The read and write block size can be tuned. In our experiments, we chose a PostMark workload that performs 200,000 transactions on 200,000 files. Read and Write buffer sizes are set to 4 KB. IoMeter is another flexible and configurable benchmark tool that is also widely used in industries and the research community. It can be used to measure the performance of a mounted file system or a block device. We ran the IoMeter on NTFS with 4 KB block size for the workload of 67% random writes and 33% random reads.

Based on our design and implementation of the three data protection technologies, we carried out a recovery experiment to verify recovery capability of COW snapshots. This experiment simulated an editing process of our paper using Microsoft Word 2007. We picked up three time points as i−1, i, and i+1 with 2 minutes interval between two adjacent time points and enabled COW snapshot for data protection. At the beginning of time point i−1, we have a word document file that only has a title and an abstract for a paper. The size of the file is 12 KB. From time point i−1 to time point i, we added new text to a paper. The size of the file became 16 KB. Later on we accidentally deleted some text and only left the title. The size of the file shrank to 11 KB. The accident time was between time points i and i+1. At the storage server side, we collected all LBA traces for verification analysis. In this experiment, two COW snapshots were made one started at time point i−1 and the other started at time point i. Our first recovery attempt was to do an undo recovery by writing the snapshot started at time point i to the fresh data at time point i+1. As a result of this attempt, we can undo storage data to time point i and opened the word file. This confirms the recoverability of COW snapshots using the undo process.

Our second recovery attempt was to do a redo recovery assuming that the fresh data is lost. After we destroyed the fresh data at time point i+1, we tried to recover data to time point i in three possible cases using only the original data at time point i−1 and two snapshots started at time points i−1 and i, respectively. First, we overwrote the snapshot started at time point i−1 to storage data at time point i−1. The word file was opened because snapshot started at time point i−1 has the same data values as original storage data for changed blocks between time points i−1 and i. The newly typed text from time i−1 to i was lost and the size of the file is still 12 KB. Secondly, we overwrote the snapshot started at time point i to storage data at time point i−1. The file size became 16 KB, but the word file cannot be opened because data is corrupted. We observed the same results for the third case where we overwrote two snapshots to storage data at time point i−1. Therefore, we failed to recover data to time point i for all three cases. By analyzing LBA traces, we found that both substantial write set $A'_i$ and write set $A_{i+1}$ contain 35 LBAs with 5 LBAs being different. That is, $A'_i \subseteq A_{i+1}$. As stated in theorem 1, data cannot be recovered to time point i by COW snapshots. This conclusion is consistent with our recovery experiment.

Having tested the capability and limitation of COW snapshots, we carried out a similar recovery experiment to verify two-way recovery capability of CUP. By using the same storage operations as our first recovery experiment discussed above, we stored parities at time point i and i+1 instead of COW snapshots. When original data $F_{i-1}$ is deleted, we took parities at time point i+1 and fresh data $F_{i+1}$ to compute snapshot $F_i/A_{i+1}$ back. We then used the snapshot together with the fresh data to recover storage data $F_i$ using the undo process. This recovery process was done successfully and the word file was opened. On the other hand, when we destroyed the fresh data with only the original data at time point i and parities being available, we used parities at time point i and original data $F_{i-1}$ to generate incremental backup $F_i/A_i$ as seen at time i. We then tried to recover storage data $F_i$ using the redo process. We were able to recover data and the word file was opened. Therefore, CUP can recover data in two directions. This fact is consistent with our theoretical proof of Theorem 3.

CUP architecture provides additional recovery capability over COW snapshots and incremental backups. Specifically, it is capable of recovering data in two directions, redo and undo. One immediate question is whether such additional capability comes at high cost. In order to quantitatively evaluate how CUP performs in comparison with COW snapshots and incremental backups, we carried out two experiments to measure and compare the performances of the three data protection technologies.

Using the performance of incremental backup technology as a baseline reference, we define performance penalty of CUP as:

$$Penalty_{cup} = \frac{Thrput \text{ of Backup} - Thrput \text{ of } CUP}{Thrput \text{ of Backup}} \quad (4)$$

and performance penalty of COW snapshots as:

$$Penalty_{cow} = \frac{Thrput \text{ of Backup} - Thrput \text{ of } COW}{Thrput \text{ of Backup}} \quad (5)$$

Our first experiment is to compare the performances of the three data protection technologies assuming the data protection interval to be 5 minutes. That is, the storage system will take incremental backup, COW snapshot, or CUP at every 5 minutes so that in case of failures one can recover data to 5 minutes ago. We ran the three benchmarks described in the previous section on our experimental system. TPC-C benchmark was run on Postgres database with each of the three different data protection technologies enabled. We measured the results in terms of tpmC, the number of transactions finished per minute, as performance results. For the two file system benchmarks, we measured IOps (I/O operations per second) for IoMeter and transaction rate (files per second) for PostMark as performance results, respectively. After measuring all performance results directly from the experiment, we calculated the performance penalties as defined in Equations (4) and (5) above.

FIG. 4 shows the results in terms of performance penalty of COW snapshots and CUP snapshots (at 60, 62) for TPC-C, at (64, 66) for IoMeter, and (78, 80) for Postmark for the three benchmarks when data protection interval is five minutes. As shown in FIG. 4, both CUP and COW snapshots have lower performance than incremental backups. The penalty ranges from a fraction of percentage up to 4.32%. The reason is that incremental backups do not need to read the original data from the production storage upon the first write to a block while COW snapshots copy it to the snapshot volume and CUP needs it for parity computation. Furthermore, it is also shown in FIG. 10 that CUP has slightly lower performance than COW snapshots. The difference of the two goes up to 1.16% because CUP needs additional Exclusive-OR computations.

Figure 5:
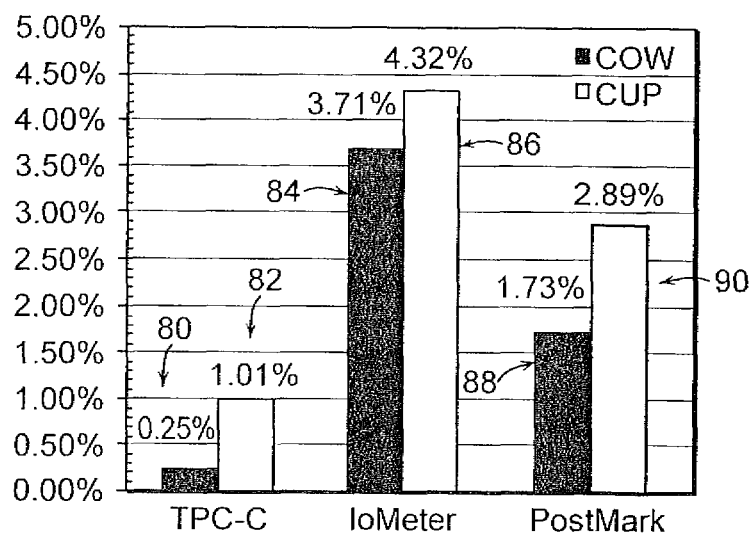
FIG. 5 is an illustrative graphical representation of performance penalty comparisons between a prior art COW system and a system in accordance with an embodiment of the invention wherein the data protection interval is 2 minutes.

In the second experiment, we changed data protection interval from five minutes to two minutes. Again, we run the three benchmarks with the same parameter settings as the first experiment to measure the performance results of the three data protection technologies. FIG. 5 shows performance penalty of COW snapshots and CUP snapshots (at 80, 82) for TPC-C, at (84, 86) for IoMeter, and (88, 90) for Postmark for the three benchmarks when data protection interval is two minutes. As shown in FIG. 5, both CUP and COW snapshots have lower performance than incremental backup with maximal penalty of 5.26%. CUP has slightly lower performance than COW snapshots. The performance penalty of CUP goes as high as 2.51% compared to COW snapshots. One exception is that COW snapshots have the same performance as incremental backups for TPC-C benchmark. One possible reason for the exception is that the frequency of write requests when running TPC-C benchmark is so low that the additional read overhead of COW snapshots is unnoticeable.

The experiments clearly demonstrated that CUP has comparable production performance as COW snapshots and incremental backups. The maximum performance penalty is less than 6% in all cases considered. This performance penalty comes from the additional computation overhead and data copying when Exclusive-OR function is performed to obtain parities. It is important to note that our evaluation here is very conservative with very high backup frequencies: 2 and 5 minutes data protection intervals as opposed to hourly or daily backups commonly done in practice. There are many possible ways to minimize the performance penalty with design optimizations. For example, effective caching techniques can be used to hide the latency of data copying. Furthermore, embedded systems or FPGA hardware can be used to carry out the Exclusive-OR computations that are done in parallel to production storage operations.

In this paper, we have presented a theoretical study on COW snapshots and incremental backups. Our theoretical work has uncovered the fundamental limitations of existing data protection technologies and explained theoretically why storage data cannot be recovered by using these existing technologies. We have provided mathematical proofs for the data recovery capabilities and limitations of the existing technologies. To the best of our knowledge, we are the first one to theoretically study the recoverability of block level storages. Based on our theoretical results, we have proposed a new architecture for data protection to overcome the limitations and given a practical example named CUP for the new technology. Instead of storing either the old data or the newly updated data, CUP stores the parities for recovery purpose by using the same amount of storage space as COW snapshots and incremental backups. In order to show the data recoverability and evaluate the performance of the new technology, we have implemented three data protection technologies: COW snapshots, incremental backups, and CUP. Experimental results show that CUP can recover data either from an old backup or from fresh production data and has comparable production performance as COW snapshots and incremental backups Those skilled in the art will appreciate that numerous modifications and variations may be made to the above disclosed embodiments without departing from the spirit and scope of the invention.

What is claimed is:

1. A data recovery system that permits recovery of data in a computer memory, said system comprising:
   an update storage system for providing backup storage of recently updated data;
   a long-term storage system for providing backup storage of data that has not been recently updated;
   a coupling functional circuit for providing a bit-wise commutative binary operation of data from the update storage system and from the long term storage system; and
   a parity register for maintaining parity snapshots, at a plurality of periods of time, of the output of the coupling functional circuit;
   wherein said plurality of periods of time include a first time point to recover storage data using an undo process and a second time point to recover storage data using a redo process while using the same storage operations for both processes.

2. The system as claimed in claim 1, wherein said commutative binary operation is an exclusive-or functional operation.

3. The system as claimed in claim 1, wherein said system further includes a logic block address detector that provides an output to the parity register.

4. The system as claimed in claim 1, wherein said update storage system includes a copy-on-write backup system.

5. The system as claimed in claim 1, wherein said long-term storage system includes a full backup system.

6. The system as claimed in claim 1, wherein said computer memory is included in a host storage.

7. The system as claimed in claim 1, wherein said computer memory is included in a server storage.

8. A method or providing data recovery functionality that permits recovery of data in a computer memory, said method comprising the steps of:
   providing backup storage of recently updated data in an update storage system;
   providing backup storage of data that has not been recently updated in a long term storage system;
   performing a bit-wise commutative binary operation of data from the update storage system and from the long term storage system; and
   providing parity snapshots, at a plurality of periods of time, of the output of the bit-wise commutative binary operation to a parity snapshot register;
   wherein said plurality of periods of time include a first time point to recover storage data using an undo process and a second time point to recover storage data using a redo process while using the same storage operations for both processes.

9. The method as claimed in claim 8, wherein said method further includes the step of performing a logic block address detecting prior to providing parity snapshots of the output of the bit-wise commutative binary operation to a parity snapshot register.

10. The method as claimed in claim 8, wherein said commutative binary operation includes an exclusive-or operation.

11. The method as claimed in claim 10, wherein said method further includes the step of performing a logic block address decoding prior to providing parity snapshots of the output of the bit-wise exclusive-or operation to a parity snapshot register.

12. The method as claimed in claim 8, wherein said step of providing backup storage of recently updated data involves performing a copy-on-write backup operation.

13. The method as claimed in claim 8, wherein said step of providing backup storage of data that has not been recently updated involves performing a full backup operation.

14. The method as claimed in claim 8, wherein said computer memory is included in a host storage.

15. The method as claimed in claim 8, wherein said computer memory is included in a server storage.

16. A data recovery system that permits recovery of data in a computer memory, said system comprising:
   an update storage system for providing backup storage of recently updated data in a server host;
   a long-term storage system for providing backup storage of data in a production storage that has not been recently updated;
   a coupling functional circuit for providing a bit-wise Exclusive-Or operation of data from the update storage system and from the long term storage system; and
   a logic block address detector that provides an output to a parity register, said parity register for maintaining parity snapshots, at a plurality of periods of time, of the output of the coupling functional circuit;
   wherein said plurality of periods of time include a first time point to recover storage data using an undo process and a second time point to recover storage data using a redo process while using the same storage operations for both processes.

17. The system as claimed in claim 16, wherein said system further includes an encoder in communication with the logic block address detector.

18. The system as claimed in claim 17, wherein said encoder receives an output from the bit-wise Exclusive-Or operation.

19. The system as claimed in claim 16, wherein said update storage system includes a copy-on-write backup system.

20. The system as claimed in claim 16, wherein said long-term storage system includes a full backup system.

* * * * *

UNITED STATES PATENT AND TRADEMARK OFFICE
CERTIFICATE OF CORRECTION

PATENT NO.       : 8,862,842 B2                                    Page 1 of 1
APPLICATION NO.  : 12/580757
DATED            : October 14, 2014
INVENTOR(S)      : Qing K. Yang et al.

It is certified that error appears in the above-identified patent and that said Letters Patent is hereby corrected as shown below:

On the title page of the issued Patent at item (73), please delete "Plantation, RI" and replace with --Providence, RI--

Signed and Sealed this
Sixth Day of January, 2015

Michelle K. Lee
*Deputy Director of the United States Patent and Trademark Office*